A. L. TEETOR.
MACHINE FOR DRESSING MILLSTONES.
No. 9,853. Reissued Aug. 30, 1881.
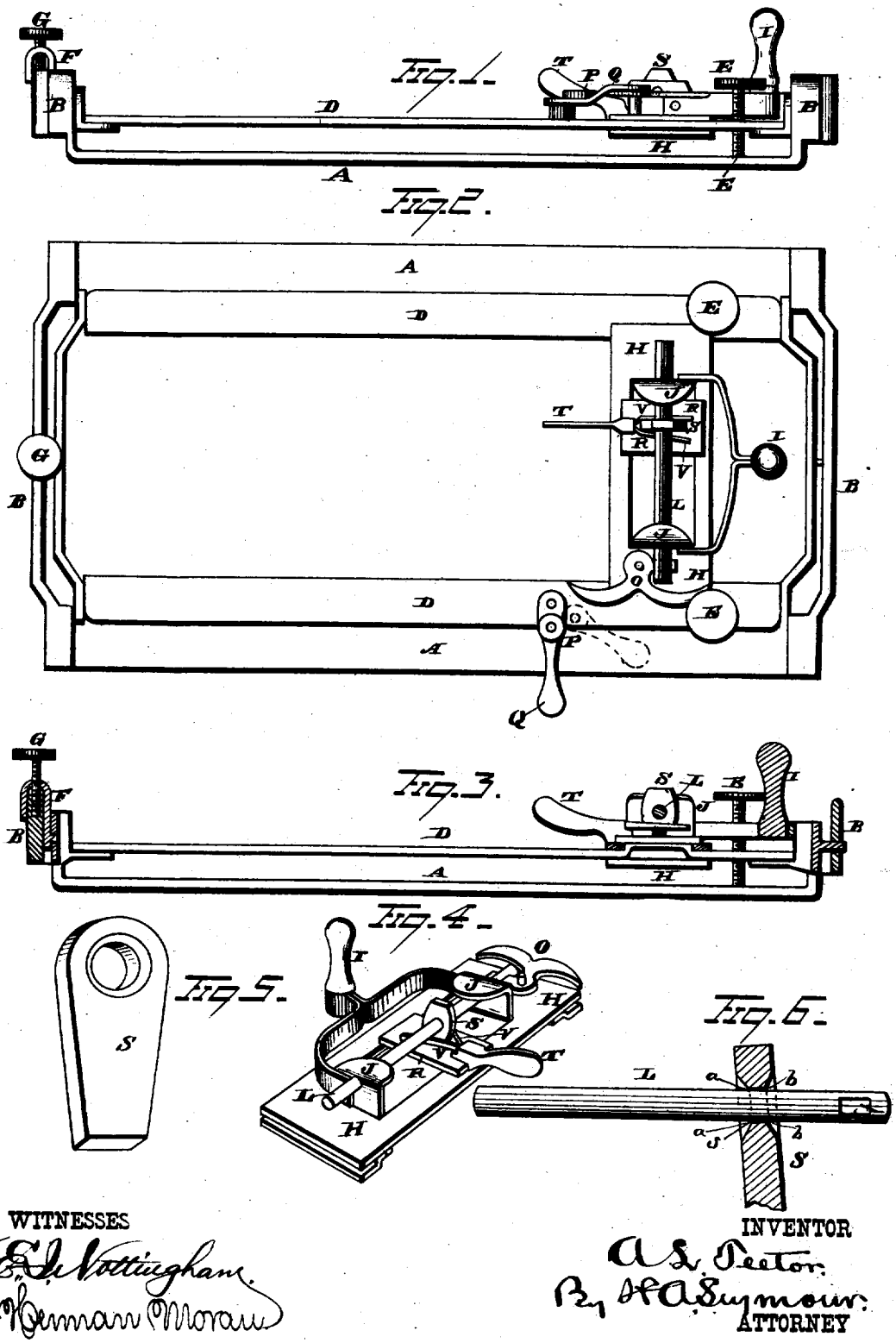
WITNESSES
E. L. Nottingham
Herman Moran
INVENTOR
A. L. Teetor.
By H. A. Seymour.
ATTORNEY
N. PETERS, Photo-Lithographer, Washington, D. C.

UNITED STATES PATENT OFFICE.

ABE L. TEETOR, OF HAGERSTOWN, INDIANA.

MACHINE FOR DRESSING MILLSTONES.

SPECIFICATION forming part of Reissued Letters Patent No. 9,853, dated August 30, 1881.

Original No. 232,861, dated October 5, 1880. Application for reissue filed July 25, 1881.

*To all whom it may concern:*

Be it known that I, ABE L. TEETOR, of Hagerstown, in the county of Wayne and State of Indiana, have invented certain new and useful Improvements in Machines for Dressing Millstones; and I do hereby declare the following to be a full, clear, and exact description of the invention, such as will enable others skilled in the art to which it pertains to make and use it, reference being had to the accompanying drawings, which form part of this specification.

My invention relates to an improvement in machines for dressing millstones, the object being to provide a millstone-dressing machine which can be made to dress furrows as well as the face of the stone, and which can be tilted from side to side to accommodate the dressing of the furrows of millstones which run either with or against the sun, and in which the cross-head carrying the stone dressing or cutting device or tool can be automatically moved from side to side.

With these ends in view my invention consists, first, in a millstone-dressing machine, in the combination, with a reciprocating rod, of a clamp connected therewith and adapted to be automatically moved to and fro on said rod.

My invention further consists, in a millstone-dressing machine, in the combination, with a reciprocating rod, of a friction-clamp engaging therewith and adapted to be moved automatically to and fro on said rod.

My invention further consists, in a millstone-dressing machine, in the combination, with a reciprocating cross-head or carriage having a reciprocating rod mounted therein, of a clamp engaging said rod and adapted to be automatically moved lengthwise thereon.

My invention further consists, in a millstone-dressing machine, in the combination, with a reciprocating rod and a head for carrying a stone-dressing tool or device, of a clamp connected with said head and engaging with the reciprocating rod and adapted to be automatically moved lengthwise on said rod.

My invention further consists, in a millstone-dressing machine, in the combination, with a combined reciprocating and tilting cross-head or carriage having a reciprocating rod mounted therein, of a head for carrying the stone-dressing device or tool and a clamp connecting said head with the reciprocating rod, said clamp being constructed and arranged to be automatically moved to and fro on said rod.

My invention further consists in certain other features of construction and combinations of parts in millstone-dressing machines, as will hereinafter be described, and pointed out in the claims.

In the accompanying drawings, Figure 1 is a side elevation of my invention. Fig. 2 is a plan view of the same. Fig. 3 is a vertical longitudinal section. Fig. 4 is a perspective view of the cross-head and its attachments. Fig. 5 is a view in perspective of the friction-clamp, and Fig. 6 is a detached view of the reciprocating rod and friction-clamp.

A represents the bed-plate, which rests upon the surface of the stone, and which is made in one solid piece. The ends B of this frame extend considerably above the side portions, so that the pivots upon which the tilting frame tilts from side to side can be raised high enough above the sides of the frame to allow the tilting frame to tilt sufficiently to dress furrows. Pivoted in between these two ends B of the frame A is the tilting frame D, which tilts from side to side, so as to accommodate the kind of work being done, and which is adjusted to any desired position by means of the two set-screws E. These set-screws pass through the frame and bear against the top of the frame A, and thus cause the frame to assume any position that may be desired. One of the pivots in this tilting frame has its bearing in the stirrup F, which catches over the top edge of one of the ends B, and which is made vertically adjustable by means of the set-screw G. By means of the stirrup and set-screw G one end of the tilting frame can be raised or lowered at will, so as to cause the bosom or furrow at this point of the stone to be dressed more or less than at the skirt, as may be desired.

The cross-head H, which moves back and forth in the tilting frame, is provided with a handle, I, for operating it, and the inner ends of the handle-frame are secured to the projections J, which extend a suitable distance above the top of the cross-head and have their upper ends turned inward toward each other.

These projections J form the bearings for a smooth endwise-moving rod, L, which is attached at one end to a double-cam-shaped lever, O, which lever is pivoted to one side of the rod. This lever is shaped as shown at the outer end, so that as the cross-head is moved back and forth upon the tilting frame this lever will come in contact with the friction-roller P on the pivoted lever Q. This friction-roller is placed to one side of the pivot upon which the lever turns, so that the lever can be moved so as to bring the roller nearer to or farther from the double-cam-shaped lever, according to the amount of endwise movement it is intended to give the smooth rod. By moving this lever inward so that it stands almost in a line with the side of the tilting frame, this double-cam-shaped lever strikes against it with both of its ends, and thus causes the smooth rod to be moved back and forth through its bearings J.

Through the cross-head is made an opening which extends at right angles to the opening through the tilting frame, and moving back and forth in the opening is the head R, which carries the diamond or other stone-dressing device. The small cross-head or carrier for diamonds or other stone-dressing devices is provided with two stocks, which are vertically adjustable by hand-wheels on the screw, one of the stocks being held at a fixed point laterally, while the other one is adjustable laterally, so that the cuts made by two diamonds can be regulated to be made at any distance apart. The two diamonds or other stone-cutting device can be employed at one time, thereby doing twice the usual amount of work that can be done with one diamond at the same time. Projecting from the top of this head is the friction-clamp S, which can be inclined from side to side, and through which the smooth rod passes. The friction-clamp S is provided with a rod-opening, *s*, of slightly greater diameter than that of the rod, so that the clamp may be inclined in either direction, and thereby cause either the biting-sections *a a* or *b b* to engage the rod for automatically imparting movement to the clamp in either direction by reciprocating the rod. This friction-clamp can be inclined from side to side by means of a lever, T, which has two springs, V, secured to the inner end, which springs catch on each side of the clamp, as shown. When this lever is moved toward one side of the tilting frame this friction-clamp is inclined toward the opposite direction and held in that position.

While the friction-clamp is inclined toward one side and the rod is made to reciprocate back and forth by means of the double-cam-shaped lever, the frictional contact of this with the side of the rod causes the head R to move constantly toward that side of the frame toward which the clamp is inclined until the clamp strikes the turned-in end of the ear or projection J. When the clamp strikes this ear it can be moved no farther in that direction; but the shifting-lever must be turned in the opposite direction, so as to incline the clamp toward the other ear or projection, when, by again moving the cross-head back and forth, the head R will be moved toward the opposite side of the tilting frame each time that the cam-shaped lever is operated by the friction-roller.

This machine is adapted for dressing millstones in every desirable manner, as can readily be seen by the different motions of the various parts.

I would have it understood that I do not restrict myself to the exact form and construction of friction-clamps shown and described, but consider that any friction-clamp combined with a reciprocating rod to perform the same result in substantially the same way to be within the spirit and scope of my invention.

Having fully described my invention, what I claim as new, and desire to secure by Letters Patent, is—

1. In a millstone-dressing machine, the combination, with a reciprocating rod, of a clamp connected therewith and adapted to be automatically moved to and fro on said rod, substantially as set forth.

2. In a millstone-dressing machine, the combination, with a reciprocating rod, of a friction-clamp engaging therewith and adapted to be automatically moved to and fro on said rod, substantially as set forth.

3. In a millstone-dressing machine, the combination, with a reciprocating rod, of an adjustable friction-clamp engaging therewith and adapted to be automatically moved in either direction on said rod, substantially as set forth.

4. In a millstone-dressing machine, the combination, with a reciprocating cross-head or carriage having a reciprocating rod mounted therein, of a clamp engaging said rod and adapted to be automatically moved thereon in either direction, substantially as set forth.

5. In a millstone-dressing machine, the combination, with a reciprocating rod and a head for carrying a stone-dressing tool or device, of a clamp connected with said head and engaging with the reciprocating rod and adapted to be automatically moved on said rod in either direction, substantially as set forth.

6. In a millstone-dressing machine, the combination, with a reciprocating and tilting cross-head or carriage having a reciprocating rod mounted thereon, of a head for carrying a stone-dressing tool or device and a clamp connecting said head with the reciprocating rod, said clamp being constructed and arranged to be automatically moved on said rod in either direction, substantially as set forth.

7. In a millstone-dressing machine, the combination, with a reciprocating rod and clamp engaging therewith, said clamp adapted to be automatically moved in either direction on said rod, of a device for regulating the extent of movement of said reciprocating rod, substantially as set forth.

8. In a millstone-dressing machine, the combination, with a reciprocating cross-head or carriage, a smooth rod mounted in said carriage, a head for carrying the stone-dressing tool or device, and a clamp connecting the head and rod, of a double-cam-shaped lever connected with said rod, and a device for actuating said lever, and thereby reciprocating the rod, substantially as set forth.

9. In a machine for dressing millstones, the combination of the cross-head, provided with ears or projections, through which passes a smooth rod, a mechanism for reciprocating this rod back and forth as the cross-head is moved back and forth in its frame, and a head carrying the stone-dressing device or tool, which is connected to and operated by the smooth rod, substantially as set forth.

10. In a machine for dressing millstones, the head R, provided with the friction-clamp, which can be inclined from side to side, in combination with the adjusting-lever provided with the spring V, substantially as set forth.

11. In a machine for dressing millstones, the combination, with the rod and double-cam-shaped lever, of the pivoted lever provided with a friction-roller, the parts being arranged to impart greater or less motion to the rod, as may be desired, substantially as set forth.

In testimony that I claim the foregoing I have hereunto set my hand this 23d day of July, 1881.

ABE L. TEETOR.

Witnesses:
CHARLES MURRAY,
OSCAR JOHNSTON.